April 11, 1950 E. S. PURINGTON 2,503,412
NAVIGATIONAL SYSTEM WITH BEACON FOR DETERMINING
ANGULAR POSITION AND DISTANCE
Filed April 12, 1945 3 Sheets-Sheet 1

INVENTOR
ELLISON S. PURINGTON.
BY
ATTORNEY

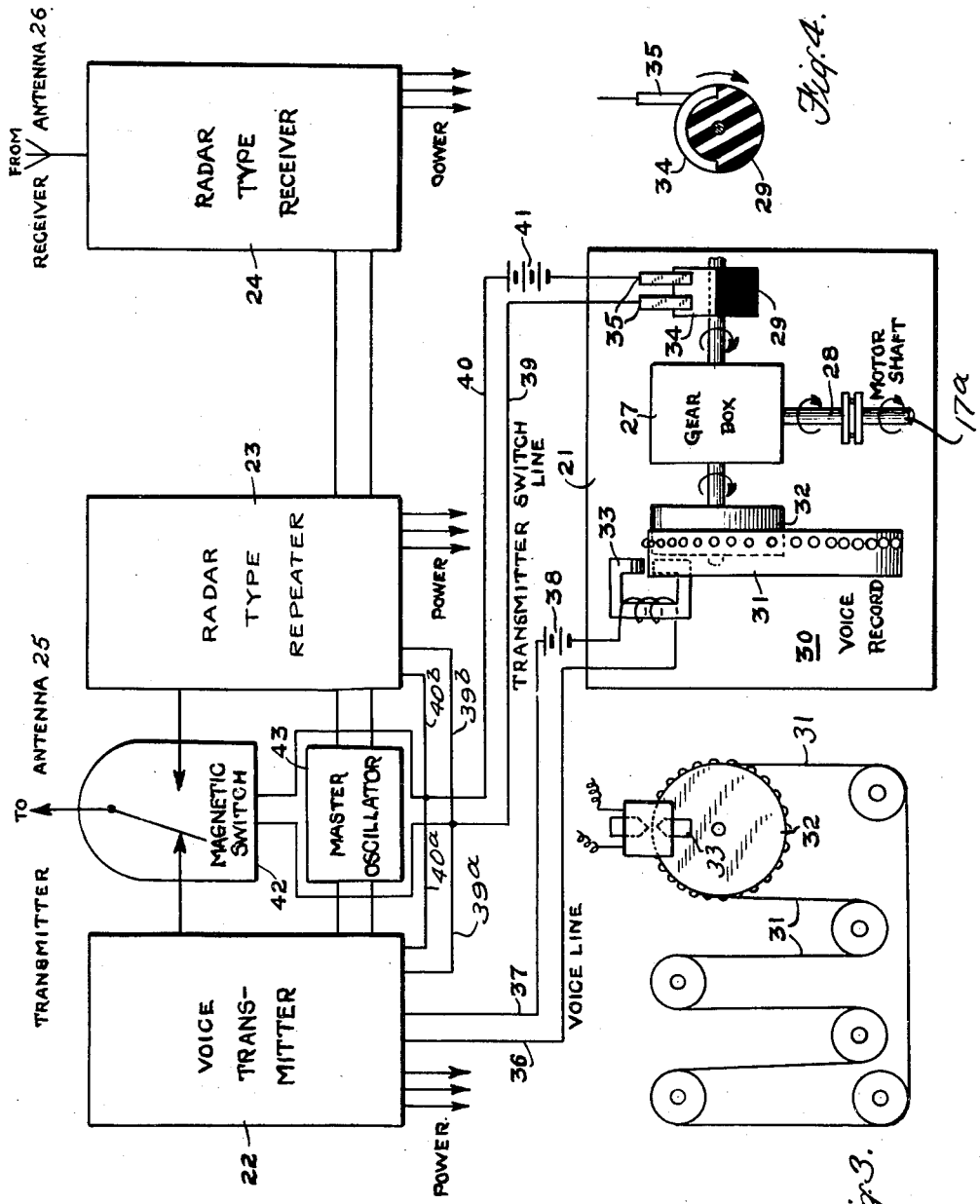

April 11, 1950 E. S. PURINGTON 2,503,412
NAVIGATIONAL SYSTEM WITH BEACON FOR DETERMINING
ANGULAR POSITION AND DISTANCE
Filed April 12, 1945 3 Sheets-Sheet 3

INVENTOR
ELLISON S. PURINGTON
BY
ATTORNEY

Patented Apr. 11, 1950

2,503,412

UNITED STATES PATENT OFFICE 2,503,412

NAVIGATIONAL SYSTEM WITH BEACON FOR DETERMINING ANGULAR POSITION AND DISTANCE

Ellison S. Purington, Gloucester, Mass., assignor, by mesne assignments, to Radio Corporation of America, New York, N. Y., a corporation of Delaware Application April 12, 1945, Serial No. 587,958

7 Claims. (Cl. 343—6)

This invention relates to an improved type of navigational system for furnishing information to a mobile craft as to its direction and distance from a fixed location. It comprises a radio beacon at a fixed location and suitable transmitting and receiving equipment on the mobile craft, such as marine or aircraft, with provisions for suitable cooperation between the two portions of the equipment.

The radio beacon provides two types of radio service. The first type consists in sending out information which can be received by the conventional type of radio receiver for advising the recipient of the signal as to his direction with respect to the beacon. This type of information in many cases will provide sufficient navigational information. The second type of service consists in providing a definite, efficient, and certain point of return for radar type signals sent out by mobile craft which will enable the navigator to know not only the direction of but also the distance from the fixed beacon station.

In accordance with this invention means are provided to prevent navigators from sending out radar type distance finding signals except when signal of a predetermined carrier frequency is being received as when there is a beacon in suitable location and condition to receive and return distance measuring pulses. In this manner the distance finding service of the beacon is made available to a large number of mobile craft with a minimum of interference.

These results are effected by using a rotary beacon with directional transmission characteristics to give voice announcements of the beacon designation and the directional information. In addition the beacon includes a radar type receiver to receive pulse type radar signals from the mobile craft and means for repeating them back to the source of the pulses on a different frequency channel. Preferably the pulses are repeated over the same carrier frequency and from the same transmitter radiator as the directional information.

By this arrangement, the directional information given by the beacon serves to advise the navigator of the proper direction in which he should direct his distance determining radar pulses. Since the pulses are returned to the navigator after a change of frequency, it is definitely known that the pulses have been returned from a known beacon and not from a reflector of unknown location, and since the pulses are returned from the beacon at a time when the beacon is known to be directed toward the navigator, the navigator will have positive and reliable information as to both direction and distance from a known landmark. In addition the directional features of the receiving and transmitting devices at the beacon, and the increase of signal level upon repeating the pulses make it possible to use more compact, less complex and less powerful radar type transmitters on the mobile craft than would be required in the usual forms of radar involving return of pulses from remote reflectors.

Although the novel features which are believed to be characteristic of this invention are pointed out more particularly in the claims appended hereto, the nature of the invention will be better understood by referring to the following description, taken in connection with the accompanying drawings, in which a specific embodiment thereof has been set forth for purposes of illustration.

In the drawings,

Fig. 2 is a schematic diagram illustrating one type of directional receiving and radiating system for use in the beacon station;

Fig. 3 is a detail view of the voice record and pick-up mechanism;

Fig. 4 is a detail view of the commutator for the voice record; and

Certain specific terms have been used herein for convenience in describing one embodiment of the invention. It is to be understood, however, that the terms are not used in a limiting sense and that the invention is not to be restricted thereby.

Figure 1:
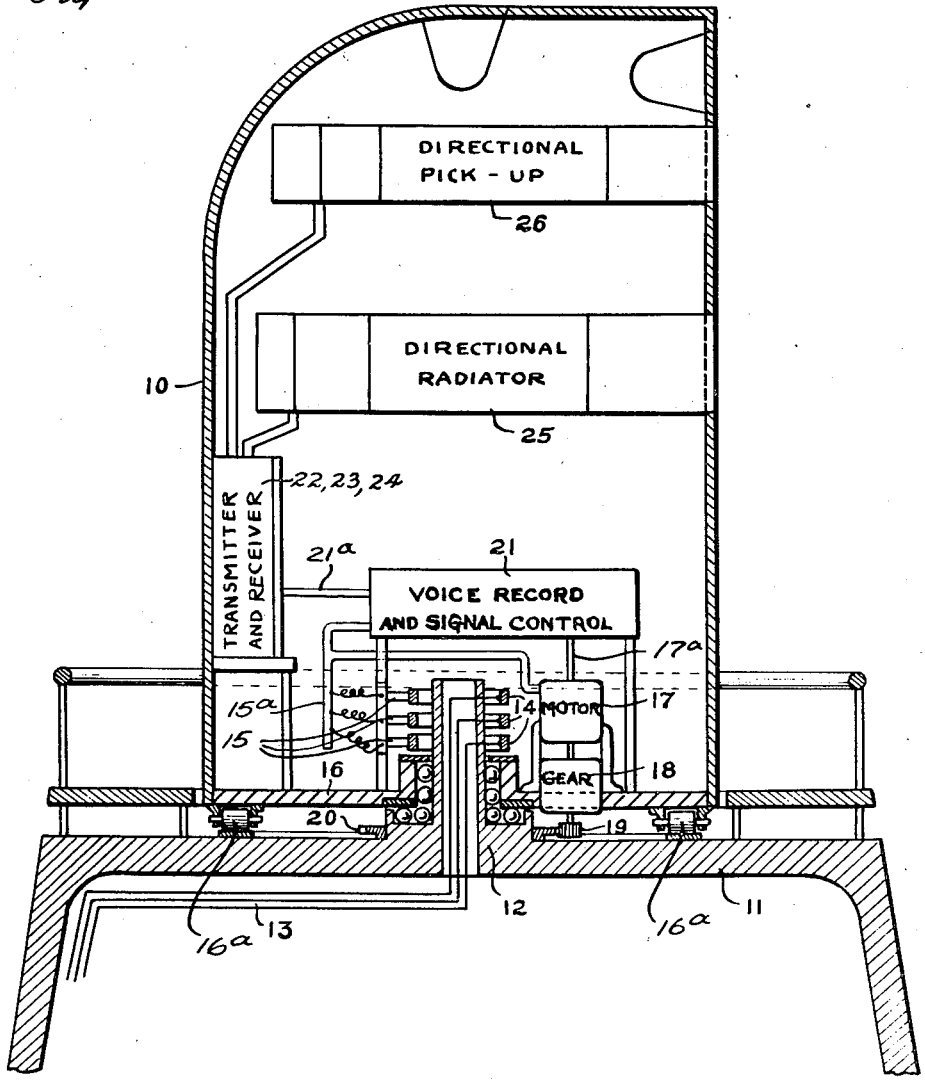
Fig. 1 is a vertical section showing the general mechanical arrangement of a beacon station embodying my invention.

In Fig. 1 a beacon house 10 is rotatably mounted on a tower 11 with a central bearing 12 through the center of which electric power lines 13 are led into the interior of the beacon house and connected to three slip rings 14, provided with brushes 15, all suitably insulated from each other and from the bearing 12. The beacon house is mounted on a turn table structure 16 preferably supported from the tower 11, a central ball bearing 16 and roller bearings 16a. A motor 17 with reduction gear 18 secured to the turntable 16 drives the turntable at a suitable rate through a driving gear 19 and a fixed rack 20. Power for driving the motor 17 and for the transmitter and receiver equipment is taken from the brushes 15 through cable 15a.

The shaft 17a of motor 17 also drives a voice record and signal control mechanism 21 mounted over the turntable and electrically connected by cable 21a to transmitting and receiving equipment mounted around the walls of the beacon house. The transmitter equipment is electrically connected to a directive radiator 25 and the receiver equipment is connected to a directional pick-up device 26 which is codirectional with the radiator 25.

The nature of the beacon circuits will be more clearly understood with reference to Fig. 2.

The voice record and signal control circuit 21 includes a gear box 27 arranged to be driven by shaft 28 coupled to the drive shaft 17a of motor 17 of Fig. 1. The gear box is arranged to drive a commutator 29 (Figs. 2 and 4) and a voice record system 30 (Figs. 2 and 3). The voice record, commutator, and the turn table are rotated from the common motor source so that there is at all times a definite relation between angular settings of the three devices.

In the embodiment shown, the voice record is indicated for simplicity as of the magnetic tape type, having an endless tape 31 supported around a drum 32 and driven by sprocket teeth on the drum engaging perforations in the tape. The part of the tape upon which the voice information is recorded overhangs the drum, and runs between the pole pieces of a magnetic pick-up device 33.

The commutator 29 comprises a metallic cylindrical segment 34 supported by insulating material from the driving shaft, with brushes 35 which are electrically connected together when they both rest on the segment 34.

The winding of the pick-up 33 is connected by voice lines 36 and 37, one of which includes a battery 38 for polarizing the pick-up 33, to the input of a voice transmitter 22 of any standard type. The brushes 35 are connected by control lines 39, 40, one of which includes a battery 41, to a magnetic switch 42, and also by lines 39a, 40a to the voice transmitter 22 and by lines 39b, 40b to a radar type transmitter 23 which is of a standard type capable of producing a radio frequency carrier modulated by pulses which are of short duration as compared with the interval between pulses. The magnetic switch 42 connects the direction radiator 25 of Fig. 1 to the output of the voice transmitter 22 when the brushes 35 are on segment 34, and connects the radiator 25 to the output of the radar transmitter 23 when the brushes 35 are on the insulating material.

The lines 39a, 40a and 39b, 40b are connected to circuits for controlling the keying of the transmitters 22 and 23 in a manner well known in the art so that each will consume a minimum of power when not connected to the radiator 25. Both transmitters 22 and 23 are operated at the same carrier frequency by use of a master oscillator circuit 43, and the control lines 39a, 40a and 39b, 40b may control the transfer of exciting energy from the oscillator 43 to the higher power tubes of the transmitters 22 and 23.

A radar type receiver 24 with its input from the directional pick-up antenna 26 is permanently connected to the transmitter 23 in a manner to cause the transmitter 23 to repeat the radar pulses received by the receiver 24 and return them to the sender on a different carrier frequency.

In operation the record 31 is arranged to produce speech currents indicating the beacon designation and directive bearing, with suitable pauses between announcements during which the transmitter is cut over from voice transmitter 22 to radar transmitter 23. For example the various beacons throughout a region may be given letter designations and may be set to announce bearings every ten degrees. The announcement for example might be "M18—M19—M20—" etc. meaning station M, bearing 180 degrees, 190 degrees, 200 degrees, etc. The speech announcement might be allotted a time interval of two seconds, with two and one sixth seconds allowed for switching and radar transmission between announcements. This schedule would call for rotation of the beacon house 10 once in each two and a half minutes, with rotation of the commutator 34 once in each four and one-sixth seconds.

It will be understood that other arrangements of announcement and shifting of the transmissions between announcement and radar may be made. For example, the record may consist of two magnetic wire recordings wound in a helical groove on two non-magnetic drums, each with a travelling pick-up and reset device, with each recording operative while the other recording device is being reset. Or arrangements may be made for eliminating the magnetic switch by use of a network coupled to the transmitter radiator and to both transmitters 22 and 23. Or the switching may be made in accordance with the presence or absence of sound signals from the magnetic pick-up. The present arrangement is shown for purposes of illustration only, and modifications may be readily made by one skilled in the art.

The receiver antenna device 26 and the transmitter radiator 25 may be of any standard type suited to receive waves from a limited arc and to radiate in a narrow concentrated beam toward the source of the received waves.

Figure 5:
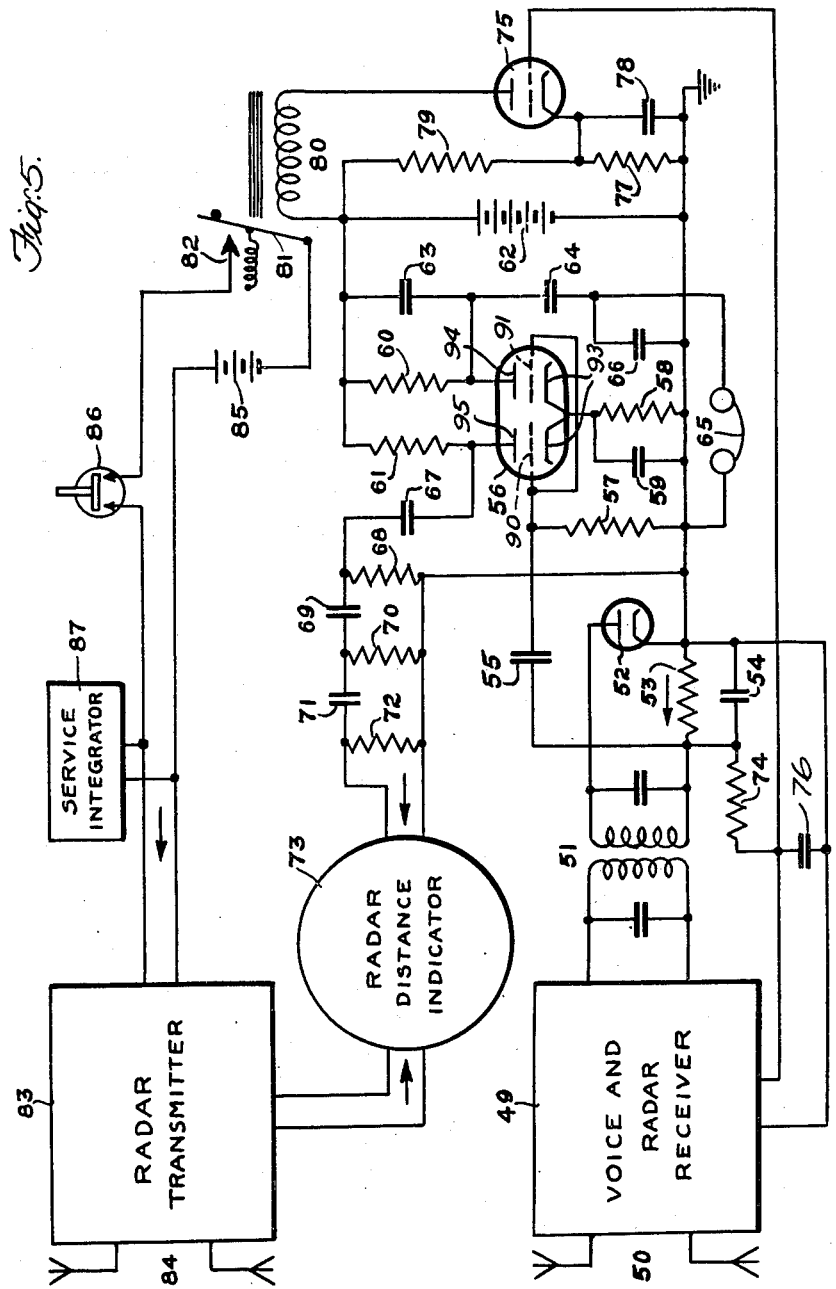
Fig. 5 is a schematic diagram of the electrical equipment in the mobile craft.

The nature of the installation for a mobile craft using the beacon of Figs. 1 to 4 is shown in Fig. 5.

The voice and radar receiver 49 is provided with antenna 50 for receiving both voice and radar signals from radiator 25 of Fig. 1. After the usual tuning, heterodyning by local oscillator and intermediate frequency amplification, the intermediate frequency output is impressed through final IF transformer 51 upon a diode detector 52 with output resistor 53, through which may flow rectified currents corresponding to voice currents from the transmitter 22 or radar pulses from the transmitter 23. The resistor 53 is by-passed by condenser 54 of as high value as practicable without modification of the pulse components through resistor 53. Pulse and voice components detected by device 52 are impressed through condenser 55 upon the two grids 90 and 91 of a duo-triode 56, and an input resistor 57. The cathodes 93 of the tube 56 are connected to ground through cathode bias resistor 58 and bypass condenser 59. The plates 94 and 95 of tube 56 are connected through resistors 60 and 61 respectively to the positive end of plate battery 62, the negative end of which is grounded. The resistor 60 is by-passed by a filter condenser 63. The plate 94 is connected through a blocking condenser 64 to headphones 65 which are bypassed by condenser 66. The condensers 63 and 66 are so chosen as to give optimum ratio of voice current to pulse current in the headphones 65, so that they will respond to the direction indicating signals sent out from the beacon.

The plate end of resistor 61 is connected through condenser 67 and a high pass resistance-condenser filter with elements 68 to 72 inclusive, to the control electrodes of a radar distance indicator shown as a cathode ray tube 73. The filter network 68—72 is adapted to pass the radar pulse signals and to suppress the voice signals.

The direct current output of detector 53 is impressed through resistor 74 upon the automatic volume control circuit of the receiver 49, and also upon the grid of relay tube 75. This line is by-passed to ground by condenser 76, so chosen as to give a suitable time constant to the VC system and relay circuit. The cathode of relay tube 75 is connected to ground through a resistor 77 shunted by condenser 78, and is also connected through a resistor 79 to the positive end of battery 62. Winding 80 of a relay having an armature 81 provided with a back contact 82 is connected between the plate of tube 75 and the positive end of battery 62. The winding 80 is normally energized but the plate current is reduced to release the armature 81 when incoming voice signals produce an increased negative bias on the grid of the tube 75. The value of condenser 76 is so chosen and the relay is so adjusted that the contact 82 remains closed during the full period when the receiver 49 is energized by voice signals from the voice transmitter carrier. Also, because of the time constant given to the relay circuit by means of the condenser 76 as mentioned above, the contact 82 remains closed for a short period after the voice signals have ceased. It is during this short period that the radar beacon 24, 23 will repeat signals transmitted from a radar transmitter 83 if a switch 86 is being held closed to put the transmitter 83 in operation.

The radar transmitter 83 with antenna 84 is connected to be rendered operative upon closure of a key circuit including the battery 85, the relay contact 82 and the push button switch 86. The radar transmitter 83 is connected to operate the sweep circuit of the direction indicator 73 in the usual manner. A service integrator 87 may be used to totalize the time that the radar transmitter has been in service.

In operation, when the beacon is directed toward the mobile craft, the receiver 49 produces voice indication in phones 65 which identifies the beacon and its direction. If distance information is desired, the push button 86 is held closed. When the voice signals are received by headphones 65, the relay 80 becomes deenergized, and the radar transmitter 83 is actuated to propagate radar signals which are received by the receiver 24 at the beacon station and are repeated by the radar transmitter 23. Radar signals returned from the transmitter 23 are detected and amplified in the receiver 49 and are fed through the filter 68—72 to actuate the control electrodes of the indicator 73 so as to give a distance indication. It is evident that in the above system the directional indications from the beacon may be received at any time by the head phones 65. However, the radar equipment can be used for determining distance only when the beacon is directed toward the vessel.

Although a specific embodiment of the invention has been set forth for purposes of illustration, it will be understood that the invention is not to be restricted thereto, but is capable of various uses and that changes and adaptations may be made therein as will be apparent to a person skilled in the art.

What is claimed is:

1. In a radio direction and distance finding system, a beacon at a fixed location comprising a rotating directional transmitter having means propagating directional indications corresponding to its various orientations, a second transmitter rotating with said directional transmitter and having means for repeating and propagating a carrier wave having a repetitive modulation thereon for determining distance as a function of the propagation time of said carrier wave, a directional receiver rotating with said transmitters having means to receive signals having said repetitive modulation thereon, means connecting said second transmitter to respond to and repeat said signals when received by said receiver, a master oscillator connected to cause said directional transmitter and said second transmitter to operate at the same frequency, and means rendering said transmitters operative alternately during each rotation thereof.

2. In a radio direction and distance finding system, a beacon at a fixed location comprising a rotating directional transmitter, a sound record having directional indicia thereon, pick-up means responsive to said sound record and connected to modulate said directional transmitter for causing the same to propagate directional indications, means synchronizing said sound record with the rotation of said directional transmitter to cause the directional indicia to correspond to the orientation of the transmitter, means rendering said transmitter operative for short intervals corresponding to the time of transmission of said directional indications, a second transmitter rotating with said directional transmitter and having means repeating and propagating a directional signal comprising a carrier wave having a repetitive modulation thereon for determining distance as a function of the propagation time of said carrier wave, a directional receiver rotating with said transmitters and having means to receive signals having said repetitive modulation thereon, means connecting said second transmitter to respond to and repeat said signals when received by said receiver, and means rendering said second transmitter operative only during intervals between successive directional transmission of said first transmitter.

3. In a radio direction and distance finding system, a transmitter to transmit signals comprising a carrier wave having a repetitive modulation thereon for determining distance as a function of the propagation time of said carrier wave, a receiver responsive to such signals returned from a remote point and also responsive to direction indicating signals, a first channel connected to said receiver responsive to said direction indicating signals, a second channel connected to said receiver and responsive to said returned signals, a distance indicating device connected to said transmitter and to said second channel and having means responsive to the elapsed time between transmission and reception to indicate the distance to said remote point, means normally rendering said transmitter inoperative, and means responsive to the reception of said direction indicating signals to render said transmitter operative for a predetermined period of time.

4. In a radio direction and distance finding system, a transmitter to transmit signals comprising a carrier wave having a repetitive modulation thereon for determining distance as a function of the propagation time of said carrier wave, a receiver responsive to such signals returned from a remote point and also responsive to direction indicating signals, a first channel connected to said receiver responsive to said direction indicating signals, a second channel connected to said receiver and responsive to said returned signals, a distance indicating device connected to said transmitter and to said second channel and having means responsive to the elapsed time between transmission and reception to indicate the distance to said remote point, means normally rendering said transmitter inoperative, and means responsive to a predetermined signal level of said direction indicating signals to render said transmitter operative for a predetermined period of time.

5. In a radio direction and distance finding system, a mobile unit comprising a transmitter having means to radiate signals comprising a carrier wave having a repetitive modulation thereon for determining distance as a function of the propagation time of said carrier wave, a receiver responsive to such signals when returned from a remote point and also responsive to directional signals, a distance indicating device connected to said transmitter and said receiver and having means responsive to elapsed time between transmission and reception to indicate the distance to said remote point, means normally rendering said transmitter inoperative, means responsive to the reception of said directional signals to render said transmitter operative, and a fixed unit at said remote point comprising a transmitter to propagate said directional signals, a receiver to receive said distance finding signals from said mobile unit and repeater means to return said last signals to said mobile unit.

6. In a radio direction and distance finding system, a mobile unit comprising a transmitter having means to radiate signals comprising a carrier wave having a repetitive modulation thereon for determining distance as a function of the propagation time of said carrier wave, a receiver responsive to such signals when returned from a remote point and also responsive to directional signals, a distance indicating device connected to said transmitter and said receiver and having means responsive to elapsed time between transmission and reception to indicate the distance to said remote point, means normally rendering said transmitter inoperative, means responsive to the reception of said directional signals to render said transmitter operative, and a fixed unit at said remote point comprising a transmitter to propagate said directional signals, a receiver to receive said repetitively modulated signals from said mobile unit and repeater means including a transmitter to return said last signals to said mobile unit.

7. In a radio direction and distance finding system, a mobile unit comprising a transmitter having means to radiate signals comprising a carrier wave having a repetitive modulation thereon for determining distance as a function of the propagation time of said carrier wave, a receiver responsive to such signals when returned from a remote point and also responsive to directional signals, a distance indicating device connected to said transmitter and said receiver and having means responsive to elapsed time between transmission and reception to indicate the distance to said remote point, means normally rendering said transmitter inoperative, means responsive to the reception of said directional signals to render said transmitter operative, and a fixed unit at said remote point comprising a rotating directional transmitter having means to propagate directional signals corresponding to its various orientations, a receiver for said repetitively modulated signals from said mobile unit and a second transmitter rotating with said first transmitter and connected to repeat and return said repetitively modulated signals.

ELLISON S. PURINGTON.

REFERENCES CITED

The following references are of record in the file of this patent:

UNITED STATES PATENTS

| Number | Name | Date |
| --- | --- | --- |
| 2,134,716 | Gunn | Nov. 1, 1938 |
| 2,159,937 | Zworykin | May 23, 1939 |
| 2,208,376 | Luck | July 16, 1940 |
| 2,252,083 | Luck | Aug. 12, 1941 |
| 2,257,320 | Williams | Sept. 30, 1941 |
| 2,284,873 | Kemp | June 2, 1942 |
| 2,333,688 | Shepard | Nov. 9, 1943 |
| 2,378,939 | Nicolson | June 26, 1945 |
| 2,405,231 | Newhouse | Aug. 6, 1946 |
| 2,417,086 | Proskauer et al. | Mar. 11, 1947 |
| 2,426,189 | Espenschied | Aug. 26, 1947 |

FOREIGN PATENTS

| Number | Country | Date |
| --- | --- | --- |
| 467,013 | Great Britain | June 9, 1937 |